April 8, 1958  W. T. WALLACE  2,829,742
SHEET METAL JOINT
Filed Nov. 8, 1951
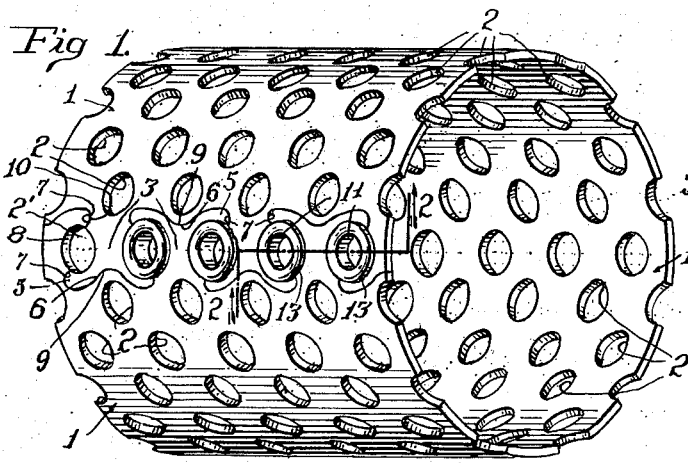
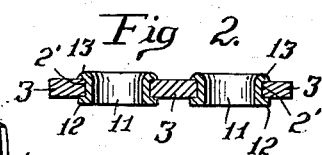
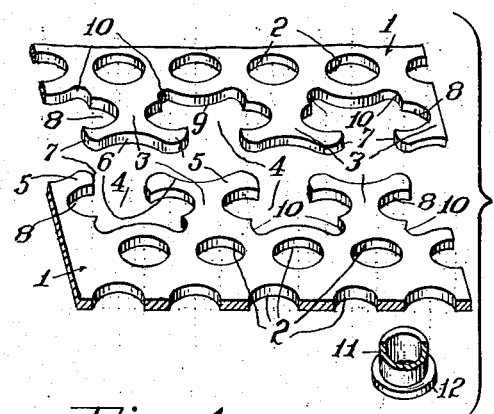
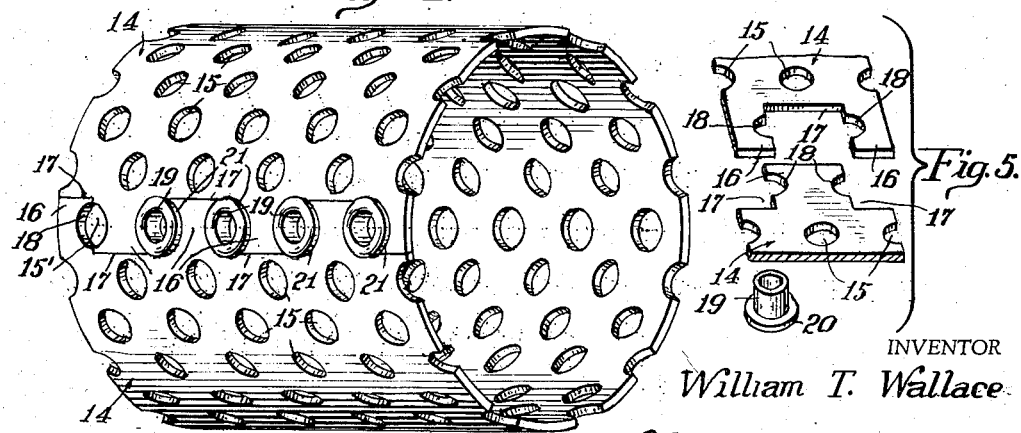
INVENTOR
William T. Wallace
BY
ATTORNEYS

United States Patent Office 2,829,742
Patented Apr. 8, 1958

2,829,742

SHEET METAL JOINT

William T. Wallace, Rochester, N. Y., assignor to Hickok Manufacturing Company, Inc., Rochester, N. Y., a corporation of New York Application November 8, 1951, Serial No. 255,510

5 Claims. (Cl. 189—36)

This invention relates to a new sheet metal joint.

While the joint is particularly adapted for use in uniting meeting edge portions of sheet metal from which a case of a shell or cartridge for a recoilless gun is formed, it will be understood that it is not limited to this particular use.

At the present time, perforated cases for the shells or cartridges of recoilless guns are formed from stiff sheet metal which is bent to a cylindrical shape and edge portions of the perforated sheet metal which are presented towards each other are secured together by welding. This has been found unsatisfactory as the heat generated when powder is exploded tends to melt the welded joint and the force of the explosion will often cause the shell casing to be split along the joint. In addition, a shell casing of this character is formed with a multiplicity of openings or perforations spaced from each other longitudinally of the casing and circumferentially thereof and this prevents the formation of a strong welded joint and also often causes openings along the joint to be filled with welding metal.

It is, therefore, one object of the invention to provide a sheet metal joint wherein meeting edge portions of the sheet metal are formed with interfitting tongues which are so secured in interfitting relation to each other that separation of the tongues and splitting of the casing along its joint will be prevented.

Another object of the invention is to provide a joint wherein meeting edge portions of a perforated sheet metal casing have interfitting tongues which are firmly secured in interfitting relation to each other by tubular rivets which pass through openings formed in edge portions of the tongues and very firmly secure the tongues to each other while at the same time not interfering with flow of gases through the connected edge portions as well as through openings in the remainder of the shell casing.

Another object of the invention is to so form the tongues and spaces between them that the inner ends of these spaces will be spaced from an adjoining row of openings formed through the sheet metal and thus prevent the connected portions of the sheet metal from being unduly weakened.

Another object of the invention is to so form the tongues and the recesses between them that blanks may be cut in side-by-side relation to each other from sheet metal by a stamping operation and thus reduce the cost of manufacture and also assure accurate fit when the tongues along meeting edges of the blanks are interfitted during the formation of a joint.

The invention is illustrated in the accompanying drawings wherein:

Fig. 1 shows a portion of a shell casing formed from stiff sheet metal and having meeting edge portions connected with each other by a joint of the improved construction;

Fig. 2 is a fragmentary sectional view taken along the line 2—2 of Fig. 1;

Fig. 3 is an exploded sectional view showing meeting portions of the sheet metal separated and also showing one of the tubular rivets;

Fig. 4 is a view similar to Fig. 1 showing a modified form of joint;

Fig. 5 is a view similar to Fig. 3 showing meeting portions of sheet metal before being connected with each other, together with one of the rivets.

The shell casing which is indicated in general by the numeral 1 may be of any length and diameter desired and is formed of stiff sheet metal of sufficient thickness to withstand the force of an explosion which occurs when the shell is fired. This shell casing is formed with a multiplicity of openings 2 arranged in spaced relation to each other longitudinally of the casing and circumferentially thereof and it should be noted that the openings formed in each row are in staggered relation to the openings of adjoining rows. Side edge portions of the sheet metal from which the shell casing is formed are cut to form tongues 3, which extend laterally of the shell casing and are gradually reduced in width toward their attached ends. Therefore, these tongues are of dovetail formation.

Referring to Fig. 3, it will be seen that the tongues 3 along each side edge portion of the sheet metal from which the casing is formed are in staggered relation to the corresponding tongues along the other side edge portion of the sheet metal and, therefore, each tongue is disposed opposite a space 4 between a pair of tongues. The tongues are of duplicate formation and each fits snugly into its companion recess or space.

The wide free end portion 5 of each tongue has an arcuate edge face 6 which at its ends merges into reversely curved edge portions 7 which terminate at ends of recesses 8. These recesses 8 are semi-circular in shape and each constitutes a portion of one of the openings 2 formed in the sheet metal. These semi-circular recesses are disposed at opposite sides of the spaces 4 formed between the tongues and at their inner ends the spaces 4 have end edges 9 which are arcuate longitudinally in conformity to the arcuate edge faces 6 of the tongues and merge into reversely curved edge portions 10 of the same dimension and curvature as the arcuate edge portions 7 of the tongues. It will thus be seen that the tongues 3 of both side edge portions of the sheet metal are exact duplicates of each other and may be so formed by cutting a long sheet of metal transversely and then separating the interfitting tongues from each other.

In order to form the shell casing from a sheet of metal having opposite side edge portions formed with the tongues, the sheet of metal is bent to a cylindrical shape and the tongues along one side edge portion are fitted between the tongues along the other side edge portion of the sheet metal. The two sets of tongues fit snugly in side-by-side relation to each other and the recesses 8 register and form a row of openings 2' and which are of the same size as the openings 2 and disposed in staggered relation to the openings of the adjoining rows. After the tongues have been fitted into the spaces 4 and thus disposed in close fitting side-by-side relation to each other, they cannot move longitudinally out of the spaces 4 as the interfitting tongues taper in opposite directions and, therefore, the casing cannot spread circumferentially.

In order to prevent the tongues from moving radially of the shell casing out of interfitting relation to each other, tubular rivets 11 are passed through the openings 2' formed by the registering recesses 8. These tubular rivets have annular flanges forming heads 12 and when they are passed outwardly through the openings 2' and outstanding heads or flanges 13 formed about their outer ends, side edge portions of the tongues will be very firmly gripped and it will be impossible for the connected tongues to slip radially of the casing out of engagement with each other. In view of the fact that the edge faces 9 of the spaces 4 are arcuate longitudinally, they are spaced from the openings 2 of an adjoining row of openings and the shell casing will not be weakened.

In Figs. 4 and 5 there has been shown a modified construction wherein the casing is formed from sheet metal 14 corresponding to the sheet metal 1 and through which openings 15 corresponding to the openings 2 are formed. Meeting side edge portions of the sheet metal 14 are cut to form tongues 16 and spaces 17 corresponding to the tongues 3 and spaces 4. It should be noted, however, that the tongues 16 are of the same width throughout their length as are also the spaces 17, instead of being gradually reduced in width, and that the free ends of the tongues 16 and the inner ends of the spaces 17 are cut straight across instead of being arcuate. Recesses 18 which correspond to the recesses 8 are formed in side edge portions of the tongues 16 midway the length thereof and when the tongues along one side edge of the shell casing are fitted between the tongues along the other side edge of the shell casing, the recesses 18 register with each other and form openings 15' corresponding to the openings 2'. The tubular rivets 19 are then passed through the openings 15' with their heads 20 disposed inwardly of the shell casing and their outer ends formed with heads 21 corresponding to the heads 13 of the rivets 11. The interfitting tongues will thus be firmly held together and will be prevented from separating when the shell is fired.

It is obvious that there is no welding metal to melt when subjected to the heat of an explosion within the casing when the shell is fired and since the rivets are tubular, the connected portions of the sheet metal are formed with a row of spaced openings corresponding to the openings formed in the remainder of the shell casing and cooperating therewith to provide openings arranged in a pattern extending continuously the full length and the entire circumference of the casing. This eliminates an unperforated portion along the joint and the force of an explosion within the casing can not subject the casing to sufficient force along the joint to rupture the casing.

While the joint has been shown in connection with a sheet metal casing for a shell used in a recoilless gun, it will be understood that the joint is not limited to this particular use but may be employed for connecting meeting edges of any metal sheets which must be firmly secured to each other. It will also be obvious that the joint may be used for connecting either sheets of perforated metal or unperforated metal and that if used for connecting unperforated metal, solid rivets may be used instead of tubular rivets.

I claim:

1. A cartridge case comprising a cylindrical body formed of stiff sheet metal having a multiplicity of openings therein, the openings being arranged in rows and spaced from each other longitudinally and circumferentially of the body, the sheet metal having side edge portions extending transversely of the body towards each other, each side edge portion of the sheet metal being provided with transverse tongues spaced from each other longitudinally of the case and fitting into spaces between the spaced tongues of the other side edge portion of the sheet metal, edges of the interfitting tongues being formed with opposed recesses registering with each other and forming an additional row of openings through the side edge portions of the sheet metal substantially corresponding in size and spacing to the first mentioned openings, and tubular fasteners having longitudinal openings completely therethrough and open at opposite ends, said fasteners passing through the openings formed by said registering recesses and having flanges about their opposite ends gripping surfaces of the sheet metal about margins of the said openings formed by the said recesses, said fasteners firmly securing the side edge portions of the sheet metal together, and the openings through the fasteners cooperating with the first mentioned openings and together therewith forming a continuous pattern of openings throughout the length and circumference of the body.

2. A cartridge case comprising a cylindrical body formed of stiff sheet metal or the like having a multiplicity of openings therein, the openings being spaced from each other longitudinally and circumferentially of the body, the sheet material having edge portions presented towards each other and formed with openings spaced from each other and arranged in a row extending longitudinally of the body, the openings of the said row substantially conforming to the size and spacing of the first mentioned openings, and tubular fasteners passing through the row of openings with ends in clamping engagement with opposite surfaces of the sheet material about the said openings, said fasteners being formed with longitudinal openings extending the full length of the fasteners and open at both ends, and the openings through the fasteners cooperating with the said multiplicity of openings and therewith providing a continuous pattern of openings extending throughout the length and circumference of the body.

3. A joint for sheet material having edge portions presented towards each other, the sheet material having a multiplicity of spaced openings therein, the said edge portions also having openings therein, hollow fasteners permanently passing through the openings in the said edge portions of the sheet material, said fasteners having openings extending throughout their length and open at both ends, said fasteners permanently joining the edge portions of the sheet material together, and the openings through the fasteners and the openings in the material forming a continuous pattern throughout the area of the sheet material.

4. The structure of claim 3 wherein the edge portions of the sheet material are each provided with laterally extending tongues spaced transversely from each other, the tongues of each edge portion fitting into spaces between the tongues of the other edge portion, edges of the tongues being formed with recesses registering with companion recesses and together therewith forming a set of openings through which the fasteners pass, and the openings extending longitudinally through the fasteners and open at opposite ends constituting pressure relief openings along the joint.

5. The structure of claim 3 wherein the edge portions of the sheet material are each provided with laterally extending tongues spaced transversely from each other, the tongues of each edge portion fitting into spaces between the tongues of the other edge portion, the tongues being of dovetailed formation and having contact with side edges of the tongues between which they fit and thereby resisting longitudinal movement of the tongues out of gripping engagement with the tongues between which they fit, said tongues having side edges provided with recesses registering with similar recesses in side edges of tongues between which they fit and together therewith forming openings spaced from each other longitudinally of the joint, the fasteners passing through the openings formed by the registering recesses and at their ends gripping surfaces of the tongues about the openings, and the openings extending longitudinally through the fasteners constituting openings spaced from each other along the joint.

References Cited in the file of this patent

UNITED STATES PATENTS

| 578,800 | Wilmot | Mar. 16, 1897 |
| 595,035 | Beranger et al. | Dec. 7, 1897 |
| 904,442 | Mayer | Nov. 17, 1908 |
| 1,143,351 | Benson | June 15, 1915 |
| 1,753,342 | Hubbard | Apr. 8, 1930 |
| 1,999,818 | McIntyre | Apr. 30, 1935 |
| 2,054,703 | Little et al. | Sept. 15, 1936 |
| 2,195,029 | Hathorn | Mar. 26, 1940 |